(12) United States Patent
Erickson

(10) Patent No.: US 8,549,965 B2
(45) Date of Patent: Oct. 8, 2013

(54) TOOLHOLDER ASSEMBLY

(75) Inventors: Robert Alfred Erickson, Raleigh, NC (US); Carla Erickson, legal representative, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 939 days.

(21) Appl. No.: 12/687,174

(22) Filed: Jan. 14, 2010

(65) Prior Publication Data

US 2011/0167969 A1 Jul. 14, 2011

(51) Int. Cl.
*B23C 1/00* (2006.01)
*B23B 29/10* (2006.01)

(52) U.S. Cl.
USPC ............. 82/160; 82/158; 408/239 R; 409/234

(58) Field of Classification Search
USPC ................ 82/160, 158; 409/234; 408/239 R
See application file for complete search history.

(56) References Cited

U.S. PATENT DOCUMENTS

| | | | |
|---|---|---|---|
| 4,135,418 A * | 1/1979 | McCray et al. .................. 82/159 |
| 4,708,040 A * | 11/1987 | Erickson ......................... 82/160 |
| 4,747,735 A | 5/1988 | Erickson et al. |
| 4,932,295 A * | 6/1990 | Erickson ......................... 82/160 |
| 5,143,495 A * | 9/1992 | Bosek .............................. 409/233 |
| 5,173,017 A * | 12/1992 | Oshnock et al. ............... 409/234 |
| 5,415,066 A * | 5/1995 | Erickson et al. ................ 82/160 |
| 5,870,935 A * | 2/1999 | Erickson et al. ................ 82/160 |
| 6,619,897 B2 | 9/2003 | Erickson et al. |
| 7,610,834 B2 | 11/2009 | Erickson |

* cited by examiner

*Primary Examiner* — Will Fridie, Jr.
(74) *Attorney, Agent, or Firm* — Larry R. Meenan, Esq.

(57) ABSTRACT

An apparatus for releasably holding a tubular toolholder shank includes a tool support member; a canister disposed within the tool support member; a lock rod movable within the tool support member in a reciprocating motion for pulling the tubular toolholder shank into a locked position and for releasing the tubular toolholder shank to an unlocked position; and at least two locking elements engaging the lock rod so that movement of the lock rod causes the locking elements to extend outward to engage the tubular toolholder shank. The lock rod includes a relief cavity extending rearward from a forward end of the lock rod. The lock rod has a maximum outer diameter and the relief cavity has a maximum diameter. A ratio of the maximum diameter of the relief cavity to the maximum outer diameter of the front portion of the lock rod is greater than approximately 1 to 4.

25 Claims, 7 Drawing Sheets

TOOLHOLDER ASSEMBLY

BACKGROUND OF THE INVENTION

1. Field of the Invention

The present invention relates to tooling for machining operations and, more particularly, relates to a toolholder assembly that precisely locates a toolholder at a selected location within a tool support member during a machining operation.

2. Description of Related Art

Minimizing the down time of a machine tool in a production environment is critical to the success of a machining facility. Historically, one major contribution to such down time was the time needed to change damaged or worn out cutting tools used by the machine tool. A cutting tool is held by a toolholder, which is typically mounted within a tool support member secured to a machine tool. When the cutting tool must be replaced, the entire toolholder with the cutting tool attached thereto is removed from the support member.

A number of couplings are designed to permit quick connecting and disconnecting of the toolholder to and from the tool support member to expedite the tool changing process. One such device is described in U.S. Pat. No. 6,619,897 entitled "Error Proofing Method and Apparatus for Cutting Tools." This patent is co-owned by the Assignee of the present application and is hereby incorporated by reference in its entirety. The toolholder assembly described in that patent utilizes four locking balls which are urged radially outward within a tool support member to engage apertures on the shank of a toolholder. While this arrangement is efficient and permits a toolholder to be removed or secured to a tool support member in a short amount of time, the tubular shank extending from the toolholder may be locked in position within the tool support member in an off center and/or slightly twisted position due to creation of uneven and non-centralized loads between the lock rod and the locking balls.

SUMMARY OF THE INVENTION

According to an embodiment of the present invention, an apparatus for releasably holding a tubular toolholder shank is provided. The apparatus includes a tool support member having a forward facing surface and a bore intersecting the forward facing surface and adapted to receive the tubular toolholder shank therein. The bore extends rearward from the forward facing surface along a longitudinal axis. A canister is disposed within the bore of the tool support member. The canister includes a longitudinal passageway and at least two circumferentially spaced apertures formed therein. A lock rod is at least partially disposed within the longitudinal passageway of the canister and movable within the tool support member in a rearward and forward reciprocating motion for pulling the tubular toolholder shank rearward within the bore into a locked position and for releasing the tubular toolholder shank from the bore to an unlocked position. At least two locking elements are disposed within the spaced apertures of the canister and engage the lock rod so that movement of the lock rod causes the locking elements to extend radially outward from the canister to engage the tubular toolholder shank. The lock rod includes a front portion having a hollow interior with an inside surface defining a relief cavity extending rearward from a forward end of the front portion of the lock rod, the lock rod has a maximum outer diameter defined at the forward end and the relief cavity has a maximum diameter defined at the forward end. A ratio of the maximum diameter of the relief cavity to the maximum outer diameter of the front portion of the lock rod is greater than approximately 1 to 4.

According to another embodiment of the present invention, an apparatus for releasably holding a tubular toolholder shank is provided. The apparatus includes a tool support member having a forward facing surface and a bore intersecting the forward facing surface and adapted to receive the tubular toolholder shank therein. The bore extends rearward from the forward facing surface along a longitudinal axis. A canister is disposed within the bore of the tool support member. The canister includes a longitudinal passageway and at least two circumferentially spaced apertures formed therein. A lock rod is at least partially disposed within the longitudinal passageway of the canister and movable within the tool support member in a rearward and forward reciprocating motion for pulling the tubular toolholder shank rearward within the bore into a locked position and for releasing the tubular toolholder shank from the bore to an unlocked position. At least two locking balls are disposed within the spaced apertures of the canister and engage the lock rod so that movement of the lock rod causes the locking balls to extend radially outward from the canister to engage the tubular toolholder shank. The lock rod has at least two depressions adapted to receive the locking balls formed therein and at least two longitudinally extending locking ramps located forward of each depression. Each of the locking ramps has an upwardly curved wall along one longitudinal side and a flat ledge along another longitudinal side when viewed along the longitudinal axis, and the upwardly curved wall of each locking ramp is adapted to engage a respective one of the locking balls when the locking ball extends radially outward from the canister.

According to another embodiment of the present invention, an apparatus for releasably holding a tubular toolholder shank is provided. The apparatus includes a tool support member having a forward facing surface and a bore intersecting the forward facing surface and adapted to receive the tubular toolholder shank therein. The bore extends rearward from the forward facing surface along a longitudinal axis. A canister is disposed within the bore of the tool support member. The canister includes a longitudinal passageway and four circumferentially spaced apertures formed therein. A lock rod is at least partially disposed within the longitudinal passageway of the canister and movable within the tool support member in a rearward and forward reciprocating motion for pulling the tubular toolholder shank rearward within the bore into a locked position and for releasing the tubular toolholder from the bore to an unlocked position. Four locking balls are disposed within the spaced apertures of the canister and engaging the lock rod so that movement of the lock rod causes the locking elements to extend radially outward from the canister to engage the tubular toolholder shank. The lock rod has locking ramps adapted to receive the four locking balls formed therein and the locking ramps in the lock rod are unequally spaced about an outer diameter of the lock rod.

According to another embodiment of the present invention, an apparatus for releasably holding a tubular toolholder shank is provided. The apparatus includes a tool support member having a forward facing surface and a bore intersecting the forward facing surface and adapted to receive the tubular toolholder shank therein. The bore extends rearward from the forward facing surface along a longitudinal axis. A canister is disposed within the bore of the tool support member, the canister includes a longitudinal passageway and a plurality of circumferentially spaced apertures formed therein. A lock rod is at least partially disposed within the longitudinal passageway of the canister and movable within the tool support member in a rearward and forward reciprocating motion for pulling the tubular toolholder shank rearward within the bore into a locked position and for releasing the tubular toolholder shank from the bore to an unlocked position. An odd number of locking elements are disposed within the spaced apertures of the canister and engaging the lock rod so that movement of the lock rod causes the locking elements to extend radially outward from the canister to engage the tubular toolholder shank.

Further details and advantages of the invention will become clear upon reading the following detailed description in conjunction with the accompanying drawing figures, wherein like parts are designated with like reference numerals throughout.

DESCRIPTION OF PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figures 1, 2:
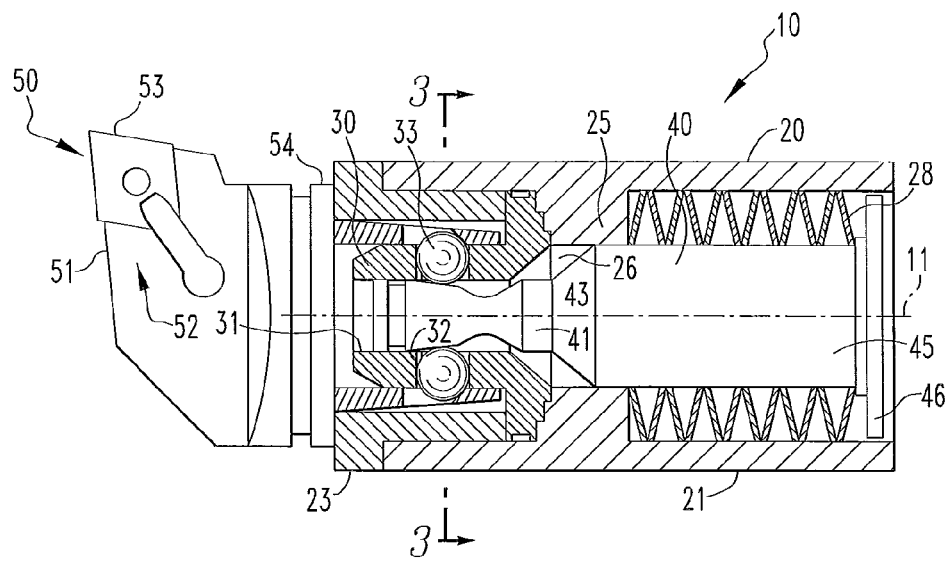
FIG. 1 is a longitudinal partial cross-sectional view of a toolholder assembly according to the prior art in a locked position.
FIG. 2 is a longitudinal partial cross-sectional view of the toolholder assembly according to the prior art in an unlocked position.
Figure 3:
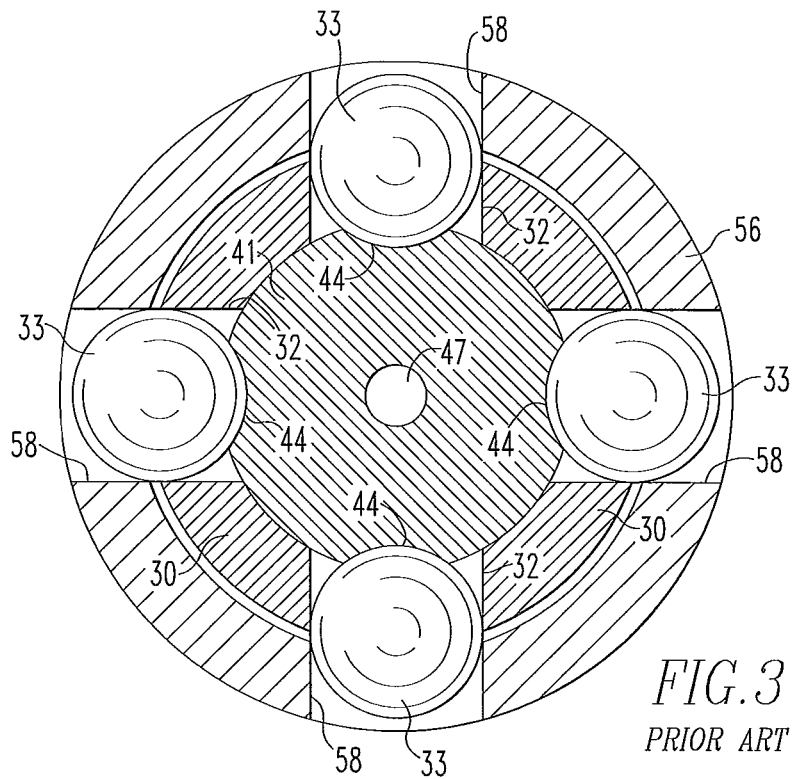
FIG. 3 is an axial cross-sectional view of a portion the prior art toolholder assembly in the locked position taken along lines 3-3 shown in FIG. 1.
Figure 4:
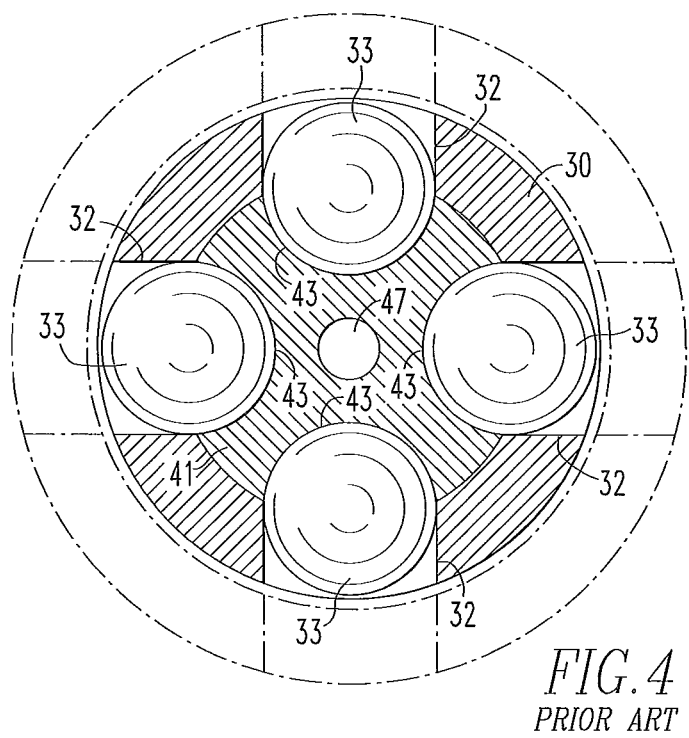
FIG. 4 is an axial cross-sectional view of a portion of the prior art toolholder assembly in the unlocked position.

With reference to FIGS. 1-4, a toolholder assembly 10 for releasably holding a toolholder 50 according to the prior art, is shown. The goal of the toolholder assembly 10 is to move a lock rod 40 back and forth along a longitudinal axis 11 within a tool support member 20 to secure a toolholder 50 within the tool support member 20 (FIGS. 1 and 3) or to eject the toolholder 50 from the tool support member 20 (FIGS. 2 and 4).

The tool support member 20 has a body 21 with a forward facing surface 24, which is defined by a toolholder receiving member 23 disposed within a forward bore 22 of the body 21. The forward bore 22 intersects with the forward facing surface 24 and extends rearward from the forward facing surface 24 along the longitudinal axis 11 for receiving the tubular shank 56 of the toolholder 50. As shown in FIGS. 2 and 4, the tubular shank 56 of the toolholder 50 may freely move in and out of the bore 22.

The lock rod 40 has a front portion 41 and a rear portion 45. The lock rod 40 may be rotationally restrained about the longitudinal axis 11. The lock rod 40 is movable within the tool support member 20 in a rearward and forward reciprocating motion for pulling the tubular shank 56 of the toolholder 50 rearward within the bore 22 into a locked position, shown in FIGS. 1 and 3, and for releasing the tubular shank 56 of the toolholder 50 from the bore 22 to the unlocked position, shown in FIGS. 2 and 4.

The rearward end 45 of the lock rod 40 is disposed within a rear passage 27 formed in the body 21 of the tool support member 20 and has a flange 46 that extends radially outward, while the body 21 of the tool support member 20 has an internal shoulder 25 extending radially inward. The opposing faces of the flange 46 and the internal shoulder 25 capture and compress a set of springs 28 positioned about the lock rod 40 within the rear passage 27 of the body 21. The springs 28 may be Bellville washers, as shown, or another compression spring known to those having ordinary skill in the art.

The purpose of this toolholder assembly 10 is to secure the toolholder 50 within the tool support member 20. The toolholder 50 has a forward side 51 and a rearward side 54. The rearward side 54 of the toolholder 50 has a rearward facing abutment surface 55 and the shank 56 is tubular with a shank wall 57 extending rearward from the rearward side 54 of the toolholder 50. The tubular shank 56 may include an alignment slot 59 extending through the shank wall 57. At least two circumferentially spaced perforations 58 are formed within the shank wall 57 of the tubular shank and extend between an inner surface and an outer surface of the shank wall 57. As shown, the circumferentially spaced perforations 58 extend radially with respect to the longitudinal axis 11 and are vertically opposing, though it is to be appreciated that the perforations 58 may be oriented with respect to each other and the longitudinal axis 11 according to any configuration known to those having ordinary skill in the art.

As shown in FIGS. 1 and 2, portions of each of the perforations 58 may also be sloped inwardly toward the center of the perforation 58 from the inner surface of the wall 57 of the tubular shank 56 to the outer surface of the wall 57, such that the perforation 58 has a frusto-conical shape. The toolholder assembly 10 is typical of a toolholder used for non-rotating tooling, such as a lathe. To that end, the forward side 51 of the toolholder 50 includes a tool receiving mechanism 52 to receive and clamp a cutting insert 53 on the toolholder 50. For instance, the tool receiving mechanism 52 may include a pocket and clamping arm for clamping the cutting insert 53. However, it is to be appreciated that the toolholder assembly 10 may have any one of a variety of clamping mechanisms and may have attached to it any one of a variety of tools that may be associated with either non-rotating or rotating applications.

With further reference to FIGS. 1-4, the tool support member 20 has a forward facing surface 24 and a bore 22. Within the bore 22, extending through the tool support member 20 along the longitudinal axis 11, is a canister 30 that extends into the bore 22 of the tool support member 20. A longitudinal passageway 31 extends through the canister 30 and the lock rod 40 is at least partially disposed within the longitudinal passageway 31 of the canister 30.

The front portion 41 of the lock rod 40 extends through an intermediate passageway 26 through the internal shoulder 25 of the body 21 of the tool support member 20. The front portion 41 of the lock rod 40 is slidably disposed within the longitudinal passageway 31 of the canister 30. Four equally spaced depressions 43 are formed in the front portion 41 of the lock rod 40, which may be aligned with four radially extending, circumferentially spaced, apertures 32 formed in the canister 30. When the lock rod 40 is moved to the right, locking elements 33, which are in the form of spherical balls 33 positioned within the apertures 32 of the canister 30 and the depressions 43 in the lock rod 40, are urged radially outward by a locking ramp 44 formed on the front portion 41 of the lock rod 40 forward of and adjacent to the depressions 43. As shown in FIGS. 3 and 4, there may be four locking elements 33 disposed within four circumferentially spaced apertures 32 in the canister 30 and four depressions 43 in the forward end 41 of the lock rod 40. A coolant channel 47 may additionally be provided within the front portion 41 of the lock rod 40 to allow for the flow of coolant liquid through the toolholder assembly 10 to the toolholder 50 and cutting insert 53.

FIGS. 2 and 4 show the toolholder 50 removed from the tool support member 20. To secure the toolholder 50 within the tool support member 20, the lock rod 40 must be positioned such that the locking elements 36 are within the depressions 43 and recessed within the spaced apertures 32 of the canister 30. In this orientation, the locking elements 33 are clear of the perforations 58 within the shank 56 of the toolholder 50 and, therefore, the tubular shank 56 of the toolholder 50 may be inserted into the bore 22.

As shown in FIG. 1, the lock rod 40 is biased towards the locked position by the springs 28 disposed about the rearward end 45 of the lock rod 40. To secure the toolholder 50 within the bore 22 of the tool support member 20, the springs 28 are released from a compressed condition between the internal shoulder 25 of the body 21 of the tool support member 20 and the flange 46 on the rearward end 45 of the lock rod 40, causing the lock rod 40 to move left to right as viewed in FIGS. 1 and 2. As the lock rod 40 moves left to right, the locking ramp 44 moves into engagement with the locking elements 33, which will tend to ride along the locking ramp 44 as the lock rod 40 moves toward the locked position. As the locking elements 33 move along the locking ramp 44, they project outward through the spaced apertures 32 in the canister 30, as shown in FIGS. 3 and 4. A locking position is achieved once the locking elements 33 are securely seated against forward facing contact surfaces within the perforations 58 of the tubular shank 56. As the locking elements 33 move up the locking ramp 44, it is to be appreciated that the ramp 44 exerts an outward directed force against the locking elements 33, resulting in a radially directed locking load that is, in turn, applied to the shank 56 through the forward facing contact surfaces of the perforations 58 to secure the toolholder 50 within the tool support member 20.

To release the toolholder 50 from the tool support member 20, the lock rod 40 is urged to the left toward the toolholder 50. In such a manner, the locking elements 33 retract within the spaced apertures 32 of the canister 30 and the depressions 43 on the lock rod 40 so that adequate clearance is provided and the toolholder 50 may be removed from the tool support member 20, as shown in FIGS. 2 and 4.

As discussed above, when the toolholder 50 is locked within the tool support member 20, there may be elastic deformation of the tubular shank 56, thereby creating high frictional forces retaining the toolholder 50 within the tool support member 20. To release the toolholder 50, the lock rod 40 is extended past the forward end of the tool support member 20, such that a forward end surface 42 of the lock rod 40 protrudes beyond the canister 30 and the tool support member 20 to contact an impact surface 60 on the rearward side 54 of the toolholder 50, thereby ejecting the toolholder 50 from the tool support member 20. Therefore, by moving the lock rod 40, the toolholder 50 may be secured or released within the tool support member 20, thereby providing for quick change of the toolholder 50.

It is to be appreciated that the mechanism for extending and retracting the lock rod 40 within the tool support member 20 is described for purposes of explanation only. The mechanism may be of any type known to those having ordinary skill as being suitable for the system described above. For instance, any one of the mechanisms described in U.S. patent application Ser. No. 12/366,137, filed on Feb. 5, 2009, and U.S. Pat. Nos. 5,415,066, 4,747,735, 4,932,295, 5,870,935, and 7,610,834, all of which are assigned to the Assignee of the present application and each of which is hereby incorporated by reference in its entirety.

With reference to FIGS. 5-8, a toolholder assembly 100 for releasably holding a toolholder, in accordance with an embodiment of the present invention, is shown. It is to be appreciated that like reference numerals in FIGS. 5-8 are used to identify like features illustrated in FIGS. 1-4 and discussed above. It is also to be appreciated that the toolholder assembly 100 operates according to the same principles discussed above with reference to FIGS. 1-4 and may be utilized with any one of the mechanisms mentioned above.

Figure 5:
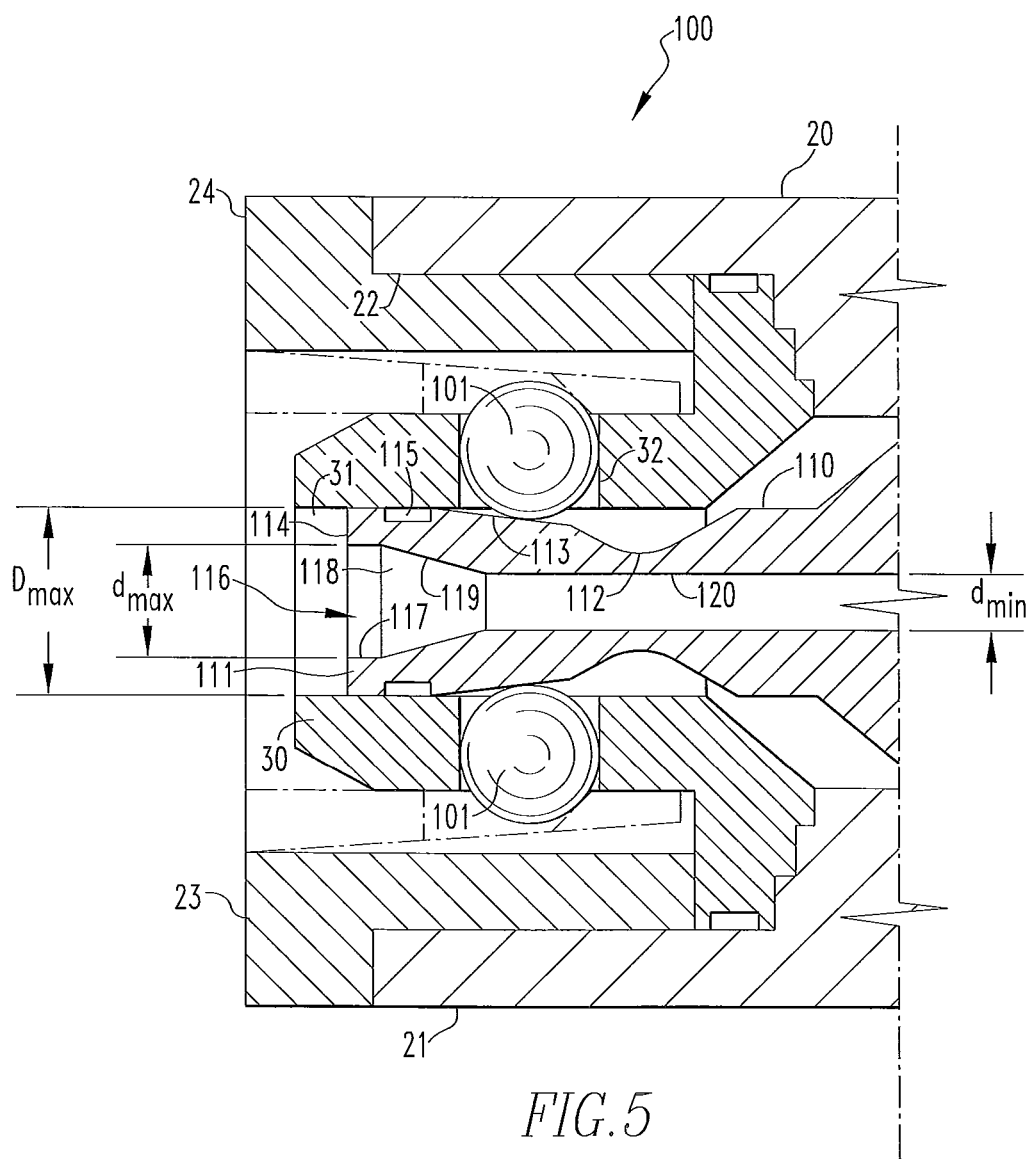
FIG. 5 is a longitudinal cross-sectional view of a portion of a toolholder assembly according to an embodiment of the present invention.

As shown in FIG. 5, the toolholder assembly 100 includes a tool support member 20 having a forward facing surface 24, which is defined by a toolholder receiving member 23, and a body 21 with a bore 22 intersecting the forward facing surface 24. The bore 22 extends from the forward facing surface 24 and is adapted to receive the tubular toolholder shank 56. A canister 30 is disposed within the bore 22 of the body 21 of the tool support member 20. The canister 30 includes a longitudinal passageway 31 and four circumferentially spaced, radially extending apertures 32, which extend through the canister 30 from the longitudinal passageway 31.

Figure 6:
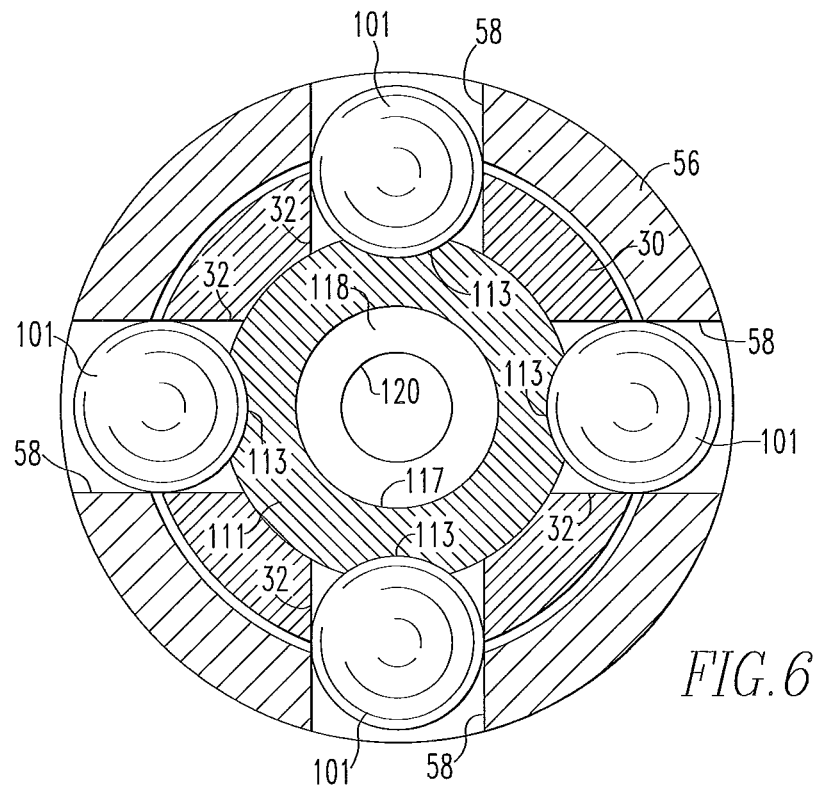
FIG. 6 is an axial cross-sectional view of a portion of the toolholder assembly shown in FIG. 5 in a locked position.
Figure 7:
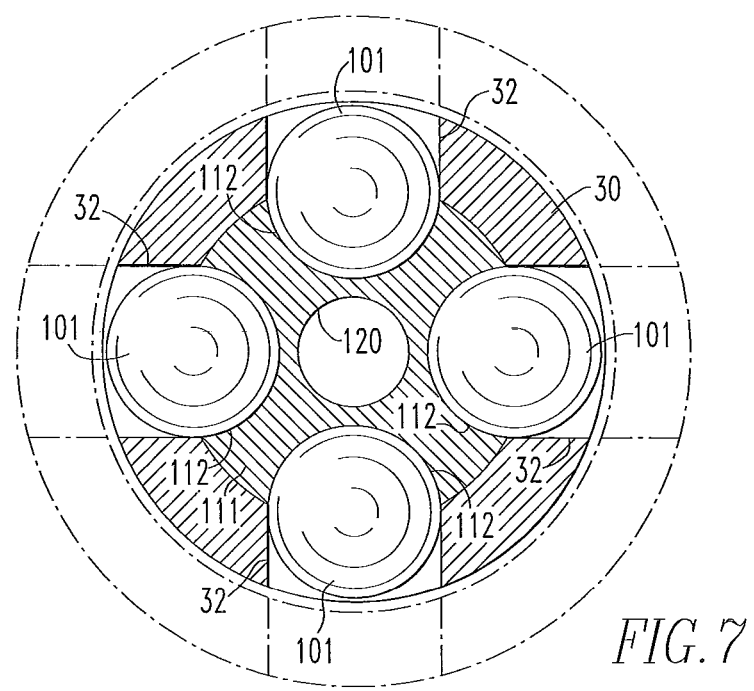
FIG. 7 is an axial cross-sectional view of the portion of the toolholder assembly shown in FIG. 5 in an unlocked position.

A front portion 111 of a lock rod 110 is disposed within the longitudinal passageway 31 of the canister 30. The lock rod 110 is movable within the tool support member 20 in a rearward and forward reciprocating motion for pulling the tubular toolholder shank 56 rearward within the bore 22 into a locked position (FIG. 6) and for releasing the tubular toolholder shank 56 from the bore 22 to an unlocked position (FIG. 7). At least two locking elements 101, for instance, four spherical locking balls 101 as shown in FIGS. 5-7, are disposed within the spaced apertures 32 of the canister 30 and engage the lock rod 40 so that movement of the lock rod 40 causes the locking elements 101 to extend radially outward from the canister 30 to engage the tubular toolholder shank 56 within the perforations 58. The front portion 111 of the lock rod 110 includes depressions 112 and locking ramps 113, as discussed above, corresponding to each locking element 101. A groove 115, which may be used to seat an O-ring sealing element on the lock rod 110, is also formed in the front portion 111 of the lock rod 110 proximate to the forward end 114 of the lock rod 110.

Figure 8:
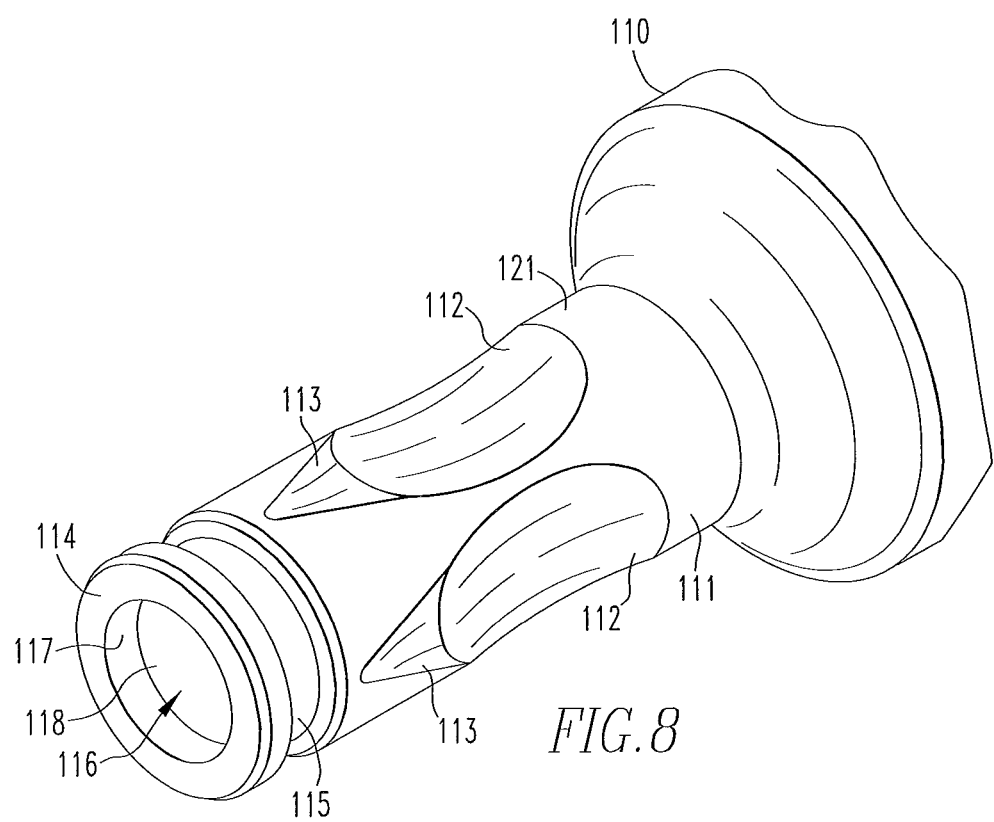
FIG. 8 is a perspective view of a portion of the lock rod of the toolholder assembly shown in FIG. 5.

With reference to FIGS. 5 and 8, the depressions 112, locking ramps 113, and groove 115 are formed in the outside surface 121 of the front portion 111 of the lock rod 110. The outside surface 121 of the front portion 111 of the lock rod 110 defines a maximum outer diameter $D_{max}$ of the front portion 111 of the lock rod 110. The maximum outer diameter $D_{max}$ of the front portion 111 of the lock rod is defined by the diameter outer surface 121 of the front portion 111 of the lock rod 110 not within the depressions 112, locking ramps 113, and groove 115.

The front portion 111 of the lock rod 110 has a hollow interior 116 with an inside surface 117. The inside surface 117 defines a relief cavity 118 that extends rearward from the forward end 114 of the front portion 111 of the lock rod 110. As discussed above, the front portion 111 of the lock rod has a maximum outer diameter $D_{max}$ defined at the forward end 114. As shown in FIG. 5, the relief cavity 118 has a maximum diameter $d_{max}$ defined at the forward end 114 of the lock rod 110. The ratio of the maximum diameter of the relief cavity $d_{max}$ to the maximum outer diameter $D_{max}$ of the front portion 111 of the lock rod 110 is greater than approximately 1 to 4. In one instance according to the present embodiment, the ratio of the maximum diameter $d_{max}$ of the relief cavity 118 to the maximum outer diameter $D_{max}$ of the front portion 111 of the lock rod 110 is approximately 3 to 5.

Also, as shown in FIG. 5, the relief cavity 118 has a tapering portion 119 that tapers inwardly in the rearward direction from the maximum diameter $d_{max}$ of the relief cavity 118 to a minimum diameter $d_{min}$. A coolant channel 120 may also be defined by the inside surface 117 of the hollow interior 116 rearward of the relief cavity 118. As shown, the tapering portion 119 of the relief cavity 118 tapers toward the coolant channel 120 and the diameter of the coolant channel 120 is equal to the minimum diameter $d_{min}$ of the relief cavity 118. In one instance according to the present embodiment, a ratio of the diameter $d_{min}$ of the coolant channel 120 to the maximum outer diameter $D_{max}$ of the front portion 111 of the lock rod 110 is approximately 1 to 4.

With reference to FIGS. 5-8, it is to be appreciated that by providing the front portion 111 of the lock rod 110 with the relief cavity 118, as shown and described, the lock rod 110 is given a thinner structure for increased flexibility so that the front portion 111 of the lock rod 110 will apply an even load to each of the locking balls 101. This is so because the front portion 111 of the lock rod 110 will deflect at the relief cavity 118 upon creation of a disproportionately large load between the lock rod 110 and each of the locking balls 101 much like a spring. The ratio of the maximum diameter $d_{max}$ of the relief cavity 118 to the maximum outer diameter $D_{max}$ of the front portion 111 of the lock rod 110 may be set so that the lock rod 110 will deflect to apply a uniform load to the locking balls 101.

Figure 9:
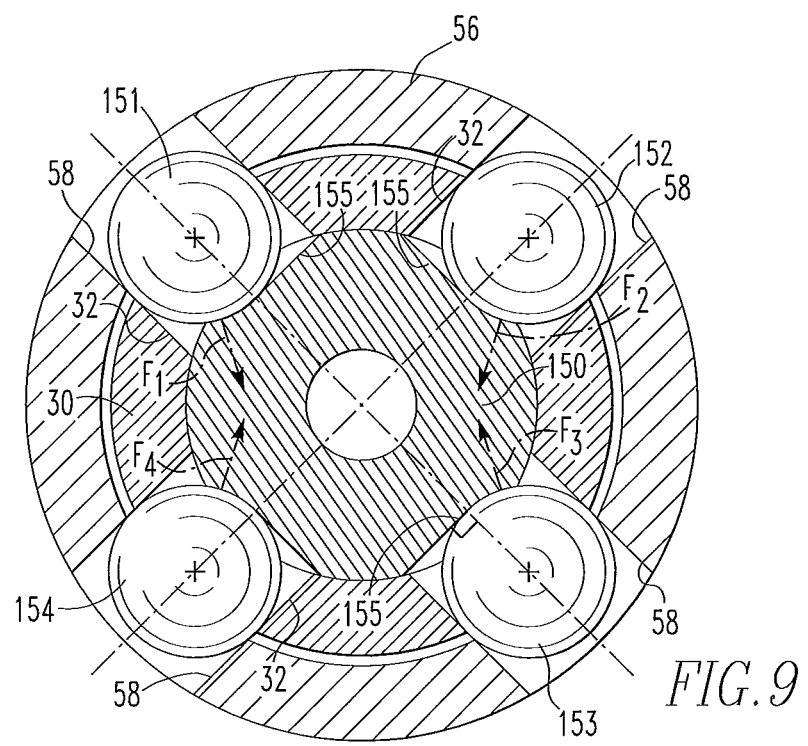
FIG. 9 is an axial cross-sectional view of a portion of a toolholder assembly in a locked position according to an embodiment of the present invention.
Figure 10:
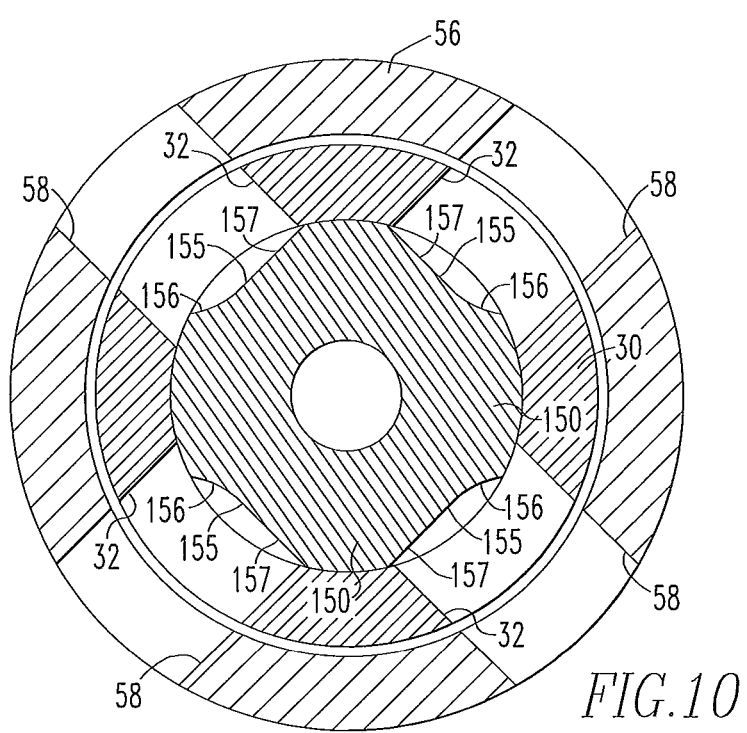
FIG. 10 is an axial cross-sectional view of the portion of the toolholder assembly shown in FIG. 9 with the locking elements removed.

With reference to FIGS. 9 and 10, a toolholder assembly according to another embodiment of the present invention, is shown. It is to be appreciated that like reference numerals in FIGS. 9 and 10 are used to identify like features illustrated in FIGS. 1-4 and discussed above. It is also to be appreciated that the toolholder assembly operates according to the same principles discussed above with reference to FIGS. 1-4 and may be utilized with any one of the mechanisms mentioned above.

The toolholder assembly includes a canister 30 that has a longitudinal passageway and four circumferentially spaced, radially extending apertures 32, which extend through the canister 30 from the longitudinal passageway. A lock rod 150 is disposed within the longitudinal passageway of the canister 30. The lock rod 150 is movable in a rearward and forward reciprocating motion for pulling the tubular toolholder shank 56 rearward into a locked position (FIG. 9) and for releasing the tubular toolholder shank 56 to an unlocked position. First, second, third, and fourth spherical locking balls 151, 152, 153, 154, as shown in FIG. 9, are disposed within the spaced apertures 32 of the canister 30 and engage the lock rod 150 so that movement of the lock rod 150 causes the locking balls 151, 152, 153, 154 to extend radially outward from the canister 30 to engage the tubular toolholder shank 56 within the perforations 58. The lock rod 110 includes four depressions and four respective locking ramps 155 corresponding to each locking ball 151, 152, 153, 154. The locking ramps 155 are located forward of the respective depressions.

As shown in FIG. 10, which illustrates the locking ramps 155 with the locking balls 151, 152, 153, 154 removed, when viewed along the longitudinal axis each locking ramp 155 has an upwardly curved wall 156 along one longitudinal side and a flat ledge 157 along another longitudinal side. As shown in FIG. 9, the locking balls 151, 152, 153, 154 will engage the upwardly curved wall 156 of the respective locking ramp 155 when the locking balls 151, 152, 153, 154 extend radially outward from the canister 30 while the flat ledge 157 extends perpendicular to a radius of the lock rod 150 extending through the center of the respective locking ball 151, 152, 153, 154. By removing one side of each locking ramp 155, the locking balls 151, 152, 153, 154 will tend to bear against the upwardly curved walls 156 when extending from the radial apertures 32 of the canister 30 and centralize in only one direction. Accordingly, the respective forces $F_1$, $F_2$, $F_3$, $F_4$ applied by the locking balls 151, 152, 153, 154 to the lock rod 150 via the locking ramps 155 will be directed away from the center of the lock rod 150 and will be equalized, thus preventing uneven loading and non-centralized positioning of the tubular toolholder shank 56 in the locked position. The lock rod 150 may additionally include a relief cavity, as described above with reference to FIGS. 5-8. Though illustrated as including four locking balls 151, 152, 153, 154, it is to be appreciated that the toolholder assembly according to the present embodiment, may be provided with a different even number of locking balls, for instance six.

Figure 11:
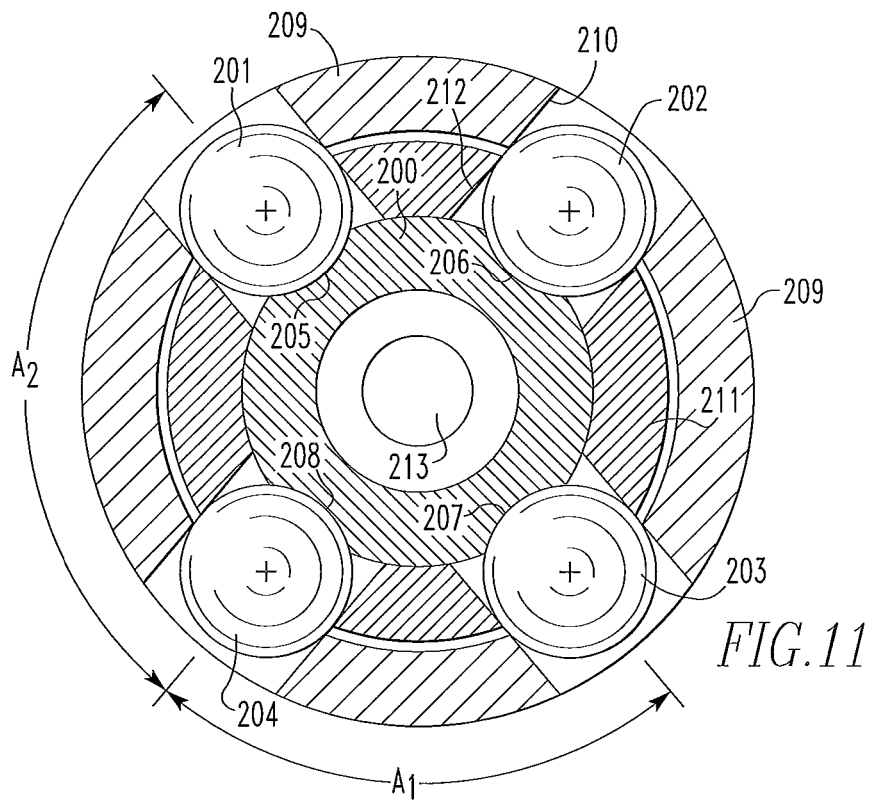
FIG. 11 is an axial cross-sectional view of a portion of a toolholder assembly in a locked position according to an embodiment of the present invention.

With reference to FIG. 11, a toolholder assembly, according to another embodiment of the present invention, is shown. It is to be appreciated that the toolholder assembly operates according to the same principles discussed above with reference to FIGS. 1-4 and may be utilized with any one of the mechanisms mentioned above.

The toolholder assembly includes a canister 211 that has a longitudinal passageway and four circumferentially spaced, radially extending apertures 212, which extend through the canister 211 from the longitudinal passageway. A lock rod 200 is disposed within the longitudinal passageway of the canister 211. The lock rod 200 is movable in a rearward and forward reciprocating motion for pulling the tubular toolholder shank 209 rearward into a locked position (FIG. 11) and for releasing the tubular toolholder shank 209 to an unlocked position. First, second, third, and fourth spherical locking balls 201, 202, 203, 204, as shown in FIG. 11, are disposed within the spaced apertures 212 of the canister 211 and engage the lock rod 200 so that movement of the lock rod 200 causes the locking balls 201, 202, 203, 204 to extend radially outward from the canister 211 to engage the tubular toolholder shank 209 within the perforations 210. The lock rod 200 includes four depressions and four respective locking ramps 205, 206, 207, 208 corresponding to each locking ball 201, 202, 203, 204. The locking ramps 205, 206, 207, 208 are located forward of the respective depressions. The lock rod 200 may additionally include a relief cavity 213, as described above, with reference to FIGS. 5-8. Though illustrated as including four locking balls 201, 202, 203, 204, it is to be appreciated that the toolholder assembly, according to the present embodiment, may be provided with a different number of locking balls.

As shown in FIG. 11, the four locking ramps 205, 206, 207, 208, the radial apertures 212 in the canister 211, and the radial perforations 210 in the tubular toolholder shank 209 are unevenly circumferentially spaced. In particular, the locking ramps 205, 206, 207, 208 are unequally spaced about an outer diameter of the lock rod 200. The fourth locking ramp 208 and locking ball 204 are circumferentially spaced from the adjacent third locking ramp 207 and locking ball 203 by a first angle $A_1$ and from the adjacent first locking ramp 205 and locking ramp 201 by a second angle $A_2$. In one instance of the present embodiment, the first angle $A_1$ is approximately 80° and the second angle $A_2$ is approximately 100°. It is to be appreciated that the first locking ramp 205 and first locking ball 201 and the third locking ramp 207 and third locking ball 203 are also spaced from the second locking ramp 206 and second locking ball 202 by the angles $A_1$ and $A_2$, respectively. The fourth locking ramp 204 and locking ball 208 are therefore spaced from the second locking ramp 206 and locking ball 202 by approximately 180°. It is to be appreciated that the angles $A_1$ and $A_2$ may be varied so long as they are not equal. By providing uneven spacing between the locking ramps 205, 206, 207, 208, the radial apertures 212, and the radial perforations 210, the toolholder can only be mounted and locked in the tool support member in only two positions 180° apart.

Figure 12:
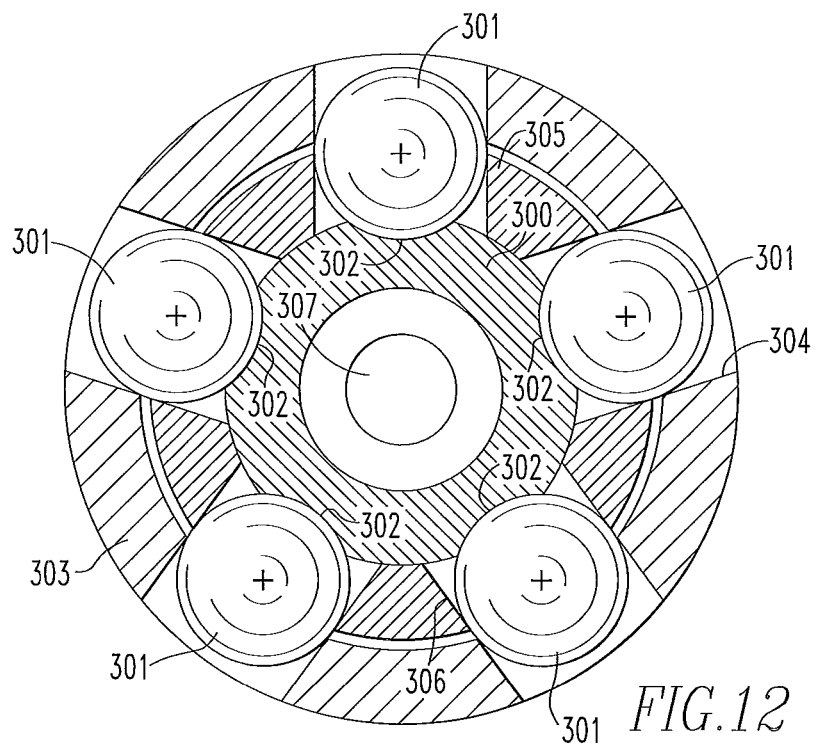
FIG. 12 is an axial cross-sectional view of a portion of a toolholder assembly in a locked position according to an embodiment of the present invention.

With reference to FIG. 12, a toolholder assembly, according to another embodiment of the present invention, is shown. It is to be appreciated that the toolholder assembly operates according to the same principles discussed above with reference to FIGS. 1-4 and may be utilized with any one of the mechanisms mentioned above.

The toolholder assembly includes a canister 305 that has a longitudinal passageway and an odd number of circumferentially spaced, radially extending apertures 306, which extend through the canister 305 from the longitudinal passageway. A lock rod 300 is disposed within the longitudinal passageway of the canister 305. The lock rod 300 is movable in a rearward and forward reciprocating motion for pulling the tubular toolholder shank 303 rearward into a locked position (FIG. 12) and for releasing the tubular toolholder shank 303 to an unlocked position. An odd number of locking elements 301, for instance, locking balls 301, as shown in FIG. 12, are disposed within the spaced apertures 306 of the canister 305 and engage the lock rod 300 so that movement of the lock rod 300 causes the locking balls 301 to extend radially outward from the canister 305 to engage the tubular toolholder shank 303 within the perforations 304. The lock rod 300 includes an odd number of depressions 302 corresponding to each locking ball 301. The lock rod 300 may additionally include a relief cavity 307, as described above, with reference to FIGS. 5-8.

As shown, the odd number of locking elements 301 comprises five locking balls 301. It is to be appreciated that the toolholder assembly, according to the present embodiment, may be provided with a different number odd number of locking elements 301, for instance three. Supplying an odd number of locking elements 301 provides error-proofing to the toolholder assembly since the toolholder cannot be positioned at 90° intervals, but instead has only one position that is likely to align with the shape of the body of the tool support member while the other positions will all appear askew. Additionally, if a symmetrical locating feature were to be provided to the toolholder assembly, according to the embodiment shown in FIG. 12, only one locked position would be possible. Such a feature would be helpful for high speed applications that require absolute error proofing.

According to another embodiment of the present invention, any of the locking elements (locking balls) 33, 101, 151-154, 201-204, 301, discussed above according to any one of the previous embodiments, may be made of a non-metallic material, for instance a ceramic or similar material. According to one embodiment, the non-metallic material comprises silicon nitride. Non-metallic locking balls may provide several advantages over typical metal locking balls in that the non-metallic locking balls are much lighter than metal balls and, therefore, cause less imbalance in rotating applications due to possible positional differences in the clamped mechanism. Non-metallic locking balls may also provide better frictional characteristics in their interaction with the steel components due to high hardness, leading to more efficient mechanisms.

While several embodiments of a toolholder assembly were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

What is claimed is:

1. An apparatus for releasably holding a tubular toolholder shank, comprising:
    a tool support member having a forward facing surface and a bore intersecting the forward facing surface and adapted to receive the tubular toolholder shank therein, the bore extending rearward from the forward facing surface along a longitudinal axis;
    a canister disposed within the bore of the tool support member, the canister including a longitudinal passageway and at least two circumferentially spaced apertures formed therein;
    a lock rod at least partially disposed within the longitudinal passageway of the canister and movable within the tool support member in a rearward and forward reciprocating motion for pulling the tubular toolholder shank rearward within the bore into a locked position and for releasing the tubular toolholder shank from the bore to an unlocked position; and
    at least two locking elements disposed within the spaced apertures of the canister and engaging the lock rod so that movement of the lock rod causes the locking elements to extend radially outward from the canister to engage the tubular toolholder shank,
    wherein the lock rod includes a front portion having a hollow interior with an inside surface defining a relief cavity extending rearward from a forward end of the front portion of the lock rod, the lock rod has a maximum outer diameter defined at the forward end and the relief cavity has a maximum diameter defined at the forward end, and a ratio of the maximum diameter of the relief cavity to the maximum outer diameter of the front portion of the lock rod is greater than approximately 1 to 4.

2. The apparatus according to claim 1, wherein the ratio of the maximum diameter of the relief cavity to the maximum outer diameter of the front portion of the lock rod is approximately 3 to 5.

3. The apparatus according to claim 1, wherein the relief cavity tapers inwardly toward a rearward end from the maximum diameter to a minimum diameter.

4. The apparatus according to claim 1, wherein the inside surface of the hollow interior of the front portion of the lock rod further defines a coolant channel formed rearward of the relief cavity.

5. The apparatus according to claim 4, wherein the coolant channel has a diameter and a ratio of the diameter of the coolant channel to the maximum outer diameter of the lock rod is approximately 1 to 4.

6. The apparatus according to claim 1, wherein the at least two locking elements comprise four balls.

7. The apparatus according to claim 1, wherein the locking elements are made of a non-metallic material.

8. The apparatus according to claim 7, wherein the non-metallic material comprises silicon nitride.

9. The apparatus according to claim 1, wherein the ratio of the maximum diameter of the relief cavity to the maximum outer diameter of the front portion of the lock rod is set so that the lock rod is adapted to deflect to apply a uniform load to the balls.

10. An apparatus for releasably holding a tubular toolholder shank, comprising:
a tool support member having a forward facing surface and a bore intersecting the forward facing surface and adapted to receive the tubular toolholder shank therein, the bore extending rearward from the forward facing surface along a longitudinal axis;
a canister disposed within the bore of the tool support member, the canister including a longitudinal passageway and at least two circumferentially spaced apertures formed therein;
a lock rod at least partially disposed within the longitudinal passageway of the canister and movable within the tool support member in a rearward and forward reciprocating motion for pulling the tubular toolholder shank rearward within the bore into a locked position and for releasing the tubular toolholder shank from the bore to an unlocked position; and
at least two locking balls disposed within the spaced apertures of the canister and engaging the lock rod so that movement of the lock rod causes the locking balls to extend radially outward from the canister to engage the tubular toolholder shank,
wherein the lock rod has at least two depressions adapted to receive the locking balls formed therein and at least two longitudinally extending locking ramps located forward of each depression, each of the locking ramps has an upwardly curved wall along one longitudinal side and a flat ledge along another longitudinal side when viewed along the longitudinal axis, and the upwardly curved wall of each locking ramp is adapted to engage a respective one of the locking balls when the locking ball extends radially outward from the canister.

11. The apparatus according to claim 10, wherein the at least two locking balls comprise four locking balls and the at least two depressions and locking ramps in the lock rod comprise four depressions and locking ramps, the four locking balls engaging respective upwardly curved walls of the locking ramps so that forces applied by the four locking balls to the lock rod via the locking ramps will be equalized.

12. The apparatus according to claim 10, wherein the locking balls are made of a non-metallic material.

13. The apparatus according to claim 12, wherein the non-metallic material comprises silicon nitride.

14. The apparatus according to claim 10, wherein the front portion of the lock rod has a hollow interior with an inside surface defining a relief cavity extending rearward from a forward end of the front portion of the lock rod.

15. An apparatus for releasably holding a tubular toolholder shank, comprising:
a tool support member having a forward facing surface and a bore intersecting the forward facing surface and adapted to receive the tubular toolholder shank therein, the bore extending rearward from the forward facing surface along a longitudinal axis;
a canister disposed within the bore of the tool support member, the canister including a longitudinal passageway and four circumferentially spaced apertures formed therein;
a lock rod at least partially disposed within the longitudinal passageway of the canister and movable within the tool support member in a rearward and forward reciprocating motion for pulling the tubular toolholder shank rearward within the bore into a locked position and for releasing the tubular toolholder from the bore to an unlocked position; and
four locking balls disposed within the spaced apertures of the canister and engaging the lock rod so that movement of the lock rod causes the locking elements to extend radially outward from the canister to engage the tubular toolholder shank,
wherein the lock rod has locking ramps adapted to receive the four locking balls formed therein and the locking ramps in the lock rod are unequally spaced about an outer diameter of the lock rod.

16. The apparatus according to claim 15, wherein one of the four locking ramps of the lock rod is spaced from an adjacent locking ramp by an angle of approximately 100° and is spaced from another adjacent locking ramp by an angle of approximately 80°.

17. The apparatus according to claim 15, wherein the locking balls are made of a non-metallic material.

18. The apparatus according to claim 17, wherein the non-metallic material comprises silicon nitride.

19. The apparatus according to claim 15, wherein the front portion of the lock rod has a hollow interior with an inside surface defining a relief cavity extending rearward from a forward end of the front portion of the lock rod.

20. An apparatus for releasably holding a tubular toolholder shank, comprising:
a tool support member having a forward facing surface and a bore intersecting the forward facing surface and adapted to receive the tubular toolholder shank therein, the bore extending rearward from the forward facing surface along a longitudinal axis;
a canister disposed within the bore of the tool support member, the canister including a longitudinal passageway and four circumferentially spaced apertures formed therein;
a lock rod at least partially disposed within the longitudinal passageway of the canister and movable within the tool support member in a rearward and forward reciprocating motion for pulling the tubular toolholder shank rearward within the bore into a locked position and for releasing the tubular toolholder shank from the bore to an unlocked position; and
an odd number of locking elements disposed within the spaced apertures of the canister and engaging the lock rod so that movement of the lock rod causes the locking elements to extend radially outward from the canister to engage the tubular toolholder shank.

21. The apparatus according to claim 20, wherein the odd number of locking elements comprises five locking elements.

22. The apparatus according to claim 20, wherein the locking elements are locking balls.

23. The apparatus according to claim 20, wherein the locking elements are made of a non-metallic material.

24. The apparatus according to claim 23, wherein the non-metallic material comprises silicon nitride.

25. The apparatus according to claim 20, wherein a front portion of the lock rod has a hollow interior with an inside surface defining a relief cavity extending rearward from a forward end of the front portion of the lock rod.

* * * * *